(12) United States Patent
Naven et al.

(10) Patent No.: US 8,059,671 B2
(45) Date of Patent: Nov. 15, 2011

(54) SWITCHING DEVICE

(75) Inventors: Finbar Naven, Cheshire (GB); Stephen John Marshall, Lancashire (GB)

(73) Assignee: Virtensys Ltd., Cheshire (GB)

( * ) Notice: Subject to any disclaimer, the term of this patent is extended or adjusted under 35 U.S.C. 154(b) by 85 days.

(21) Appl. No.: 12/252,882

(22) Filed: Oct. 16, 2008

(65) Prior Publication Data

US 2010/0014428 A1   Jan. 21, 2010

(30) Foreign Application Priority Data

Jul. 15, 2008   (GB) .................................. 0812909.0

(51) Int. Cl.
*H04L 12/56* (2006.01)
(52) U.S. Cl. ........................................ 370/416; 370/230
(58) Field of Classification Search .................. 370/230, 370/412, 468, 416, 352
See application file for complete search history.

(56) References Cited

U.S. PATENT DOCUMENTS

| | | | |
|---|---|---|---|
| 6,031,843 A * | 2/2000 | Swanbery et al. | 370/426 |
| 6,091,709 A | 7/2000 | Harrison et al. | |
| 7,039,770 B1 | 5/2006 | Chen et al. | |
| 7,561,590 B1 * | 7/2009 | Walsh | 370/416 |
| 2005/0163127 A1 | 7/2005 | Choi et al. | |
| 2005/0195845 A1 | 9/2005 | Mayhew et al. | |
| 2006/0039370 A1 | 2/2006 | Rosen et al. | |

FOREIGN PATENT DOCUMENTS

| | | |
|---|---|---|
| EP | 0 350 637 A2 | 1/1990 |
| EP | 0 874 532 A2 | 10/1998 |
| EP | 0 874 532 A3 | 10/1998 |
| EP | 1 249 977 A2 | 10/2002 |
| EP | 1 249 977 A3 | 10/2002 |
| JP | 2002-185466 | 6/2002 |
| WO | WO 2007/113474 A1 | 10/2007 |

OTHER PUBLICATIONS

International Search Report and the Written Opinion for PCT/GB2009/001520, dated Oct. 14, 2009, (16 pages).

(Continued)

*Primary Examiner* — Ricky Ngo
*Assistant Examiner* — Chandrahas Patel
(74) *Attorney, Agent, or Firm* — Barnes & Thornburg LLP

(57) ABSTRACT

A switching device comprising at least one ingress port and at least one egress port. The switching device is arranged to receive data packets through the at least one ingress port and to forward received data packets to respective ones of the at least one egress port. The switching device further comprises a primary buffer arranged to store data packets received via at least one of the least one ingress ports and a secondary buffer associated with the primary buffer. The switching device is adapted to select a data packet from the primary buffer and if but only if the secondary buffer satisfies a least one first predetermined criterion, transfer the selected data packet to the secondary buffer.

24 Claims, 8 Drawing Sheets

OTHER PUBLICATIONS

McKeown, Nick et al., "Achieving 100% Throughput in an Input-Queued Switch", *IEEE Transaction on Communications,* vol. 47, No. 8, Aug. 1999, pp. 1260-1267.

Duato, J., et al., "A Cost-Effective Technique to Reduce HOL Blocking in Single-Stage and Multistage Switch Fabrics", *Parallel, Distributed and Network-Based Processing,* 2004, Proceedings, 12th Euromicro Conference on Feb. 11-13, 2004, Piscataway, NH, USA, IEEE, pp. 1-6.

Scicchitano, Alessandra et al., "Distributed scheduling in input queued switches", *Communications,* 2007, ICC '07, IEEE International Conference on IEEE, PI, Jun. 1, 2007, pp. 6330-6335.

GB Search Report dated Jan. 10, 2009, (2 pages).

* cited by examiner

SWITCHING DEVICE

The present application claims priority, under 35 U.S.C. §119(a), to United Kingdom National Application No. 0812909.0, filed Jul. 15, 2008, which is hereby incorporated by reference herein.

The present invention relates to a switching device for switching data packets between at least one ingress port and at least one egress port.

It is often necessary to send data between devices in a computer system, for example it is often necessary to connect a processing device to a plurality of input and output devices. Appropriate data communication is achieved by connecting the devices in such a way as to allow them to send data to each other over a physical link, which may be a wired link or a wireless link.

It is known in the art to use a switch to route data packets from outputs of one or more devices to inputs of one or more other devices. Such a switch comprises one or more ingress ports arranged to allow the data packets to be received by the switch, and a plurality of egress ports arranged to allow data packets to be transmitted from the switch.

Circumstances may arise where particular data cannot be transmitted from the switch. This may occur where there is insufficient bandwidth or credit on a connecting link or where a receiving device is busy processing previously received data such that data received at a switch cannot be sent from the switch to a receiving device through the appropriate egress port. Switches may therefore contain a buffer to store data packets waiting to be transmitted from the switch through an appropriate egress port. It is known to store data in such a buffer in the form of one or more queues which temporarily store data received from a device until that data can be sent to a receiving device. These buffers often comprise memory arranged as FIFO (first in, first out) queues.

The problems and complexities of data switch design are well known in the networking and data communication art. There are many conflicting requirements that make the perfect all-purpose solution impractical to achieve. Such conflicting requirements include the need for high link speeds, the need for minimal or zero loss of data, the need for maximal throughput to achieve high bandwidth utilisation, the need for fairness in the allocation of resources, the need for controllable quality of service, the need for scalability of design, and the need to minimise cost through minimising design resources and complexity. Typically, optimising performance conflicts with minimising cost, so that design compromises need to be made based on specific application requirements.

Shared input/output (I/O) is one application for data switching. Sharing of I/O devices can lead to better resource utilisation, scalability, ease of upgrade, and improved reliability. Since cost saving is a major driver in the acceptance of I/O sharing, it is important that the cost of the data switch is minimised to ensure the cost of the switch does not offset the cost advantages provided by I/O sharing. A significant challenge faced in the design of shared I/O switches is to minimise the cost of the switch while balancing the other requirements described above.

A wide variety of switch architectures are used in the networking and data communications art. Particularly, while crossbar based switches are prevalent, the arrangement of buffering resources within switches varies. Output buffered switches contain a buffer at each egress port. Generally speaking, output buffered switches minimize congestion and maximise throughput, but are not practical for high speed applications due to limitations in scalability. For this reason, buffering resources are often provided at the inputs of a switch. Input buffered switches allow for better scaling but often suffer from congestion due to head-of-line blocking. More specifically, when a buffer at an input to a switch is implemented as a queue, and a packet at the head of the queue is destined for an egress port which is unable to accept that packet, no subsequent data packets can be processed. Thus, the inability of one egress port to accept a data packet can cause considerable congestion problems.

It is known to overcome the drawbacks of head-of-line blocking using virtual output queues. Virtual output queuing requires that each ingress port maintains a separate buffer for each egress port. Whilst virtual output queuing resolves congestion caused by head-of-line blocking, the number of buffers required can become extremely large. Further, where particular egress ports experience higher data traffic than other egress ports, virtual output queues generally do not make efficient use of a switch's buffering resources.

It follows that congestion management is an important issue in switch design. Various congestion management strategies have been proposed. However many of these proposals are disadvantageous given the complexity which they introduce. For example, some proposals involve relatively complex exchanges of messages between egress and ingress ports of a switch to control the use of buffering resources. Whilst such proposals can provide effective congestion management, this is provided at a cost which is prohibitive for some applications.

It is an object of an embodiment of the present invention to obviate or mitigate one or more of the problems outlined above.

According to a first aspect of the present invention, there is provided a switching device comprising at least one ingress port and at least one egress port. The switching device is arranged to receive data packets through said at least one ingress port and to forward received data packets to respective ones of said at least one egress port. The switching device further comprises a primary buffer arranged to store data packets received via at least one of said at least one ingress ports and a secondary buffer associated with the primary buffer. The switching device is adapted to select a data packet from said primary buffer, and if but only if said secondary buffer satisfies a least one first predetermined criterion, to transfer said selected data packet to said secondary buffer.

The first aspect of the present invention therefore allows data packets stored in said primary buffer to be processed and conditionally moved to the secondary buffer. The switching device may be arranged to select data packets from the primary buffer and the secondary buffer to be forwarded to respective ones of the egress ports. The buffers may be queues, and only data packets at the head of a queue may be selected. By moving data packets from the primary buffer to the secondary buffer, the switching device may have a greater number of data packets from which to select. This is beneficial from the point of view of mitigating head-of-line blocking issues. Thus, in some embodiments the switching device is arranged to move a data packet from the primary buffer to the secondary buffer where possible. That is, movement of a data packet from the primary buffer to the secondary buffer is not conditional upon any congestion event having occurred. Additionally, the determination of whether to move the data packet is based upon a condition relating to the secondary buffer, not upon a signal received from another part of the switching device indicating that congestion has occurred.

One of the at least one first predetermined criterion may be that said secondary buffer is empty. That is, when the secondary buffer is empty, moving a data packet from the primary buffer to the secondary buffer increases the data packets from which the switching device can select. As such, where the secondary buffer is empty it can be seen that moving the selected data packet is advantageous as such a move acts to reduce potential head-of-line blocking issues by distributing data packets between a greater number of buffers, and removing inter-dependencies from the processing of the data packets.

The switching device may be further adapted to determine an egress port to which the selected data packet is to be forwarded. One of said at least one first predetermined criterion may then be that said secondary buffer contains data packets to be forwarded to said determined egress port. This means that where one or more data packets to be forwarded to a particular egress port have been moved to a secondary buffer, other data packets to be forwarded to that particular egress port are also moved to the secondary buffer, thereby maintaining the ordering of data packets to be forwarded to the particular egress port, as well as reducing potential head of line blocking issues.

The primary buffer may be arranged to receive data packets received through a single one of said ingress ports. That is, each of the ingress ports may have a dedicated primary buffer in the sense that only data packets received through a particular ingress port are stored in a particular primary buffer. All data packets received through said single one of said ingress ports may be stored in the primary buffer. This may be so regardless of egress ports to which said data packets are to be forwarded. This means that there is no need to determine an egress port associated with a particular data packet before storing that data packet in the primary buffer. Additionally, the need for separate primary buffers for different egress ports is obviated, increasing simplicity, reducing storage requirements and allowing storage to be used more efficiently.

In alternative embodiments of the invention the primary buffer may be arranged to receive data packets received through a plurality of ingress ports.

A plurality of secondary buffers may be associated with the primary buffer. The switching device may be arranged to store, in each of said secondary buffers at any one time, data packets to be forwarded to a respective single one of said egress ports. That is, at any one time only data packets to be forwarded to a single egress port are stored in a particular secondary buffer. However, the association between an egress port and a secondary buffer need not be determined in advance, but can instead be determined dynamically. That is, each secondary buffer is initially not associated with an egress port. When a data packet to be forwarded to a particular egress port is stored in one of the secondary buffers, only data packets to be forwarded to that egress port can be stored in that secondary buffer.

The primary buffer may be implemented as a primary queue, such as, for example, a first-in-first-out (FIFO) queue. Similarly, the or each secondary buffer may be implemented as a secondary queue, such as a FIFO queue.

Each ingress port may have an associated ingress module, and each ingress module may comprise a primary buffer and one or more secondary buffers of the type described above. Each ingress module may further comprise an ingress arbiter arranged to select a data packet from one of said primary and secondary buffers to be offered for transmission to an egress port. The ingress arbiter may additionally offer a selected data packet for transmission to an appropriate egress port. Where the buffers are implemented as queues, the ingress arbiter may select data packets from the heads of the queues.

Each egress port may have an associated egress module, and each egress module may comprise an egress arbiter. The egress arbiter may be arranged to receive a requests to transmit data packets to the associated egress port from ingress arbiters associated with ingress modules. Where a plurality of requests are received by an egress arbiter, the egress arbiter may be arranged to select one of the requests to be granted, and to provide a grant signal to the appropriate ingress arbiter.

The switching device may further comprise at least one congestion buffer associated with said primary buffer. The switching device may be further adapted to determine whether a second predetermined criterion is satisfied and if but only if said second predetermined criterion is satisfied, to transfer a data packet from one of said primary or secondary buffers to one of said at least one congestion buffers.

The use of one or more congestion buffers provides yet further buffers from which data packets may be selected for onwards transmission thereby further reducing the problems of head-of-line blocking. The switching device may be arranged to transfer a data packet from said primary buffer to a respective congestion buffer if the data packet is to be forwarded to an egress port to which data packets stored in said congestion buffer are to be forwarded. This ensures that ordering is maintained. More particularly, when a first data packet to be forwarded to a particular egress port has been transferred to a congestion buffer subsequent data packets to be forwarded to that particular egress port may be transferred to the congestion buffer regardless of whether or not a congestion condition exists.

The or each congestion buffer may be implemented as a queue, such as a first-in-first-out (FIFO) queue.

The second predetermined criterion may be a criterion indicating congestion. The second predetermined criterion may be based upon a time for which a selected data packet has resided in one of said primary and secondary buffers. Where the primary and secondary buffers are implemented as queues, the secondary predetermined criterion may be based upon a time for which a data packet has been at the head of one of the primary and secondary queues.

The switching device may be adapted to transfer a data packet from one of said primary and secondary buffers to one of said at least one congestion buffers if said data packet has resided in one of said primary and secondary queues for more than a predetermined minimum time, for example if said data packet has been at the head of one of said queues for more than said predetermined minimum time.

A data packet may be transferred to one of said congestion buffers if the congestion buffer is empty. In this way, the number of data packets available for selection is maximised. A data packet may be transferred to one of said congestion buffers if said one of said congestion buffers stores data packets to be forwarded to an egress port to which the data packet to be transferred is to be forwarded. In this way, data packets to be forwarded to a particular egress port are stored in a common congestion buffer thereby maintaining data packet ordering.

The ingress arbiter may be arranged to select a data packet from at least one of said primary, secondary and congestion queues, to be offered for transmission to an egress port.

The switching device may be adapted to transfer a data packet from one of said primary and secondary queues to said congestion queue if said data packet has resided in one of said primary and secondary queues for more than a predetermined minimum time without having been selected by said ingress arbiter.

One of said second predetermined criteria may be based upon whether said ingress arbiter is able to select a particular data packet. In this way, a data packet may be transferred to a congestion buffer if a blocking condition exists in which the ingress arbiter is unable to select a data packet. In such a case transferring the data packet to the congestion buffer removes the blocking condition.

An egress module may be arranged to select a data packet to be transmitted through a respective egress port. Data may be provided indicating whether a particular egress port can receive data packets. An ingress arbiter may be configured to select a data packet only if an egress module indicates that an egress port to which the data packet is to be forwarded is able to receive data packets.

The or each egress module may be arranged to receive a plurality of requests to receive a data packet, each request being generated by an ingress arbiter, and to select one of the plurality of requests. The second predetermined criterion may be based upon an egress module selecting a request within a predetermined time period.

A second aspect of the invention provides a switching device comprising at least one ingress port and at least one egress port. The switching device is arranged to receive data packets through said at least one ingress port and to forward received data packets to respective ones of said at least one egress port. The switching device further comprises a primary buffer arranged to store data packets received via at least one of said at least one ingress ports, at least one secondary buffer associated with the primary buffer, at least one congestion buffer associated with the primary buffer, and an arbiter arranged to select a data packet to be offered for transmission to an egress port. The switching device is adapted to transfer data packets from said primary buffer to one of said at least one secondary buffers if said transfer meets a first predetermined criterion; and to transfer data packets from said primary buffer or one of said secondary buffers to one of said at least one congestion buffers if a congestion condition is detected, and a second predetermined criterion is satisfied.

The first predetermined criterion may ensure that at any one time each of said secondary buffers only stores data packets destined for a particular egress port. The second predetermined criterion may ensure that at any one time each of said congestion buffers only stores data packets destined for a particular egress port.

The switching device may be configured to connect one or more processing devices to one or more I/O devices. The switching device may be arranged to facilitate I/O virtualization. The switching device may use any convenient protocol. The switching device may, for example, use the PCI Express protocol.

It will be appreciated that aspects of the present invention can be implemented in any convenient way including by way of suitable hardware and/or software. For example, a switching device arranged to implement the invention may be created using appropriate hardware components. Alternatively, a programmable device may be programmed to implement embodiments of the invention. The invention therefore also provides suitable computer programs for implementing aspects of the invention. Such computer programs can be carried on suitable carrier media including tangible carrier media (e.g. hard disks, CD ROMs and so on) and intangible carrier media such as communications signals.

Embodiments of the present invention are now described, by way of example, with reference to the accompanying drawings, in which.

Figure 1:
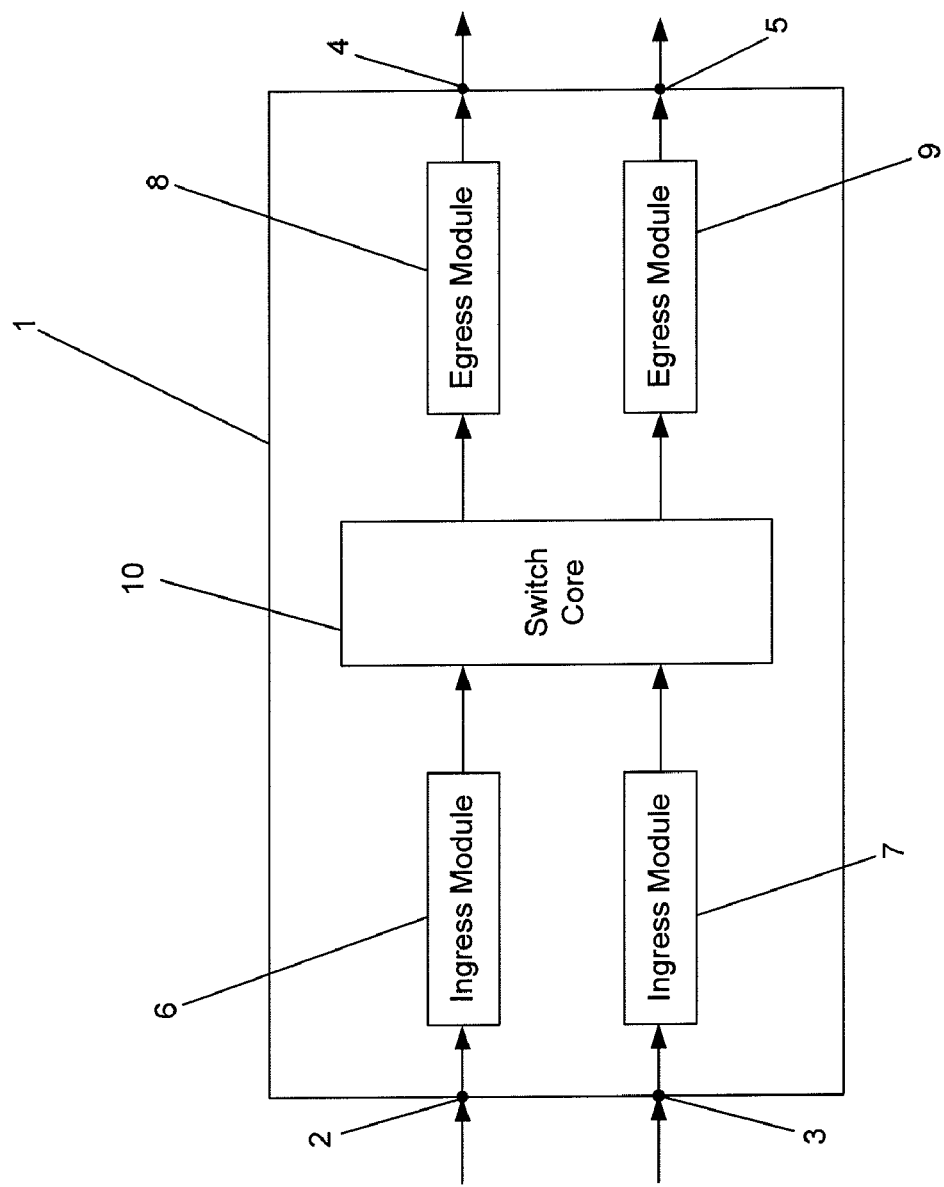
FIG. 1 is a schematic illustration of a switch having two ingress ports and two egress ports.

FIG. 1 schematically illustrates a switch 1. The switch 1 has two ingress ports 2, 3 and two egress ports 4, 5. The ingress ports 2, 3 have respective associated ingress modules 6, 7 while the egress ports 4, 5 have respective associated egress modules 8, 9. A switch core 10 connects the ingress modules 6, 7 to the egress modules 8, 9. Data packets are received through the ingress ports 2, 3 and processed by the ingress modules 6, 7 before being switched to an appropriate egress port 4, 5 by the switch core 10 via an appropriate egress module 8, 9.

The ingress module 6 is now described in further detail with reference to FIG. 2. Whilst the following description refers specifically to the ingress module 6, it will be appreciated that the description similarly applies to the ingress module 7.

Figure 2:
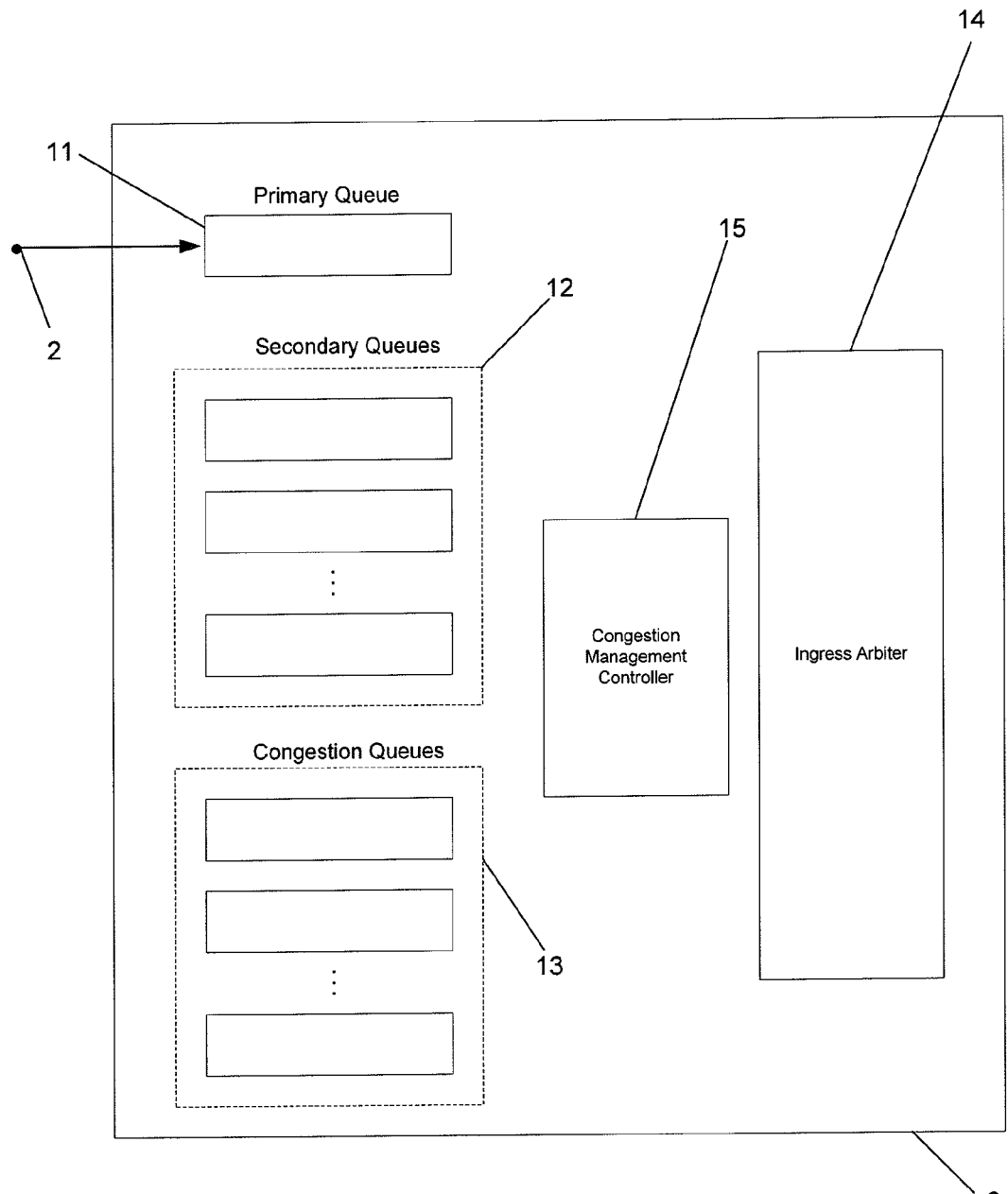
FIG. 2 is a schematic illustration of an ingress module of the switch of FIG. 1.

Referring to FIG. 2, it can be seen that the ingress module 6 comprises a single shared primary queue 11 in which data packets received through the ingress port 2 are initially stored. All data packets received through the ingress port 2 are stored in the primary queue 11, regardless of the egress port to which the received data packets are to be forwarded.

The ingress module 6 further comprises a plurality of secondary queues 12 and a plurality of congestion queues 13. Data packets are moved between the primary queue 11, the secondary queues 12 and the congestion queues 13 as is described in further detail below with reference to FIG. 4.

The secondary queues 12 and the congestion queues 13 are dynamically allocated, non-shared queues such that at any one time, each of the secondary queues 12 and the congestion queues 13 only contains data packets destined for a single egress port. For example, if one of the secondary queues contains a data packet destined for the egress port 4, only data packets destined for the egress port 4 may be added to that secondary queue. When one of the secondary and congestion queues is empty, it is able to accept data packets destined for any one of the egress ports, as described further below. Each of the secondary queues 12 and each of the congestion queues 13 has a respective associated control flag (not shown) which is used to indicate an egress port, if any, with which the queue is currently associated. The control flags are used to determine whether a particular one of the secondary queues 12 and congestion queues 13 is empty (i.e. no association is indicated by the relevant control flag) and to determine an egress port with which a particular queue is currently associated.

The ingress module 6 further comprises an ingress arbiter 14 and a congestion management controller 15.

The ingress arbiter 14 is arranged to select one of the primary queue 11, the secondary queues 12 and the congestion queues 13 and to select a data packet from the head of the selected queue to be offered for transmission to an egress port determined by the selected data packet. Selection of one of the queues by the ingress arbiter may be based upon any suitable selection algorithm, such as a simple round-robin selection algorithm. Other appropriate selection algorithms which can be used by the ingress arbiter 14 include a weighted round-robin algorithm.

The congestion management controller 15 determines whether a data packet at the head of the primary queue 11 should be moved to one of the secondary queues 12 or one of the congestion queues 13, and whether data packets at the head of one of the secondary queues 12 should be moved to one of the congestion queues 13. The determination of whether a data packet should be moved is made before that data packet is made available for selection by the ingress arbiter 14. The processing performed by the congestion management controller 15 is described in more detail below with reference to FIG. 4.

Figure 3:
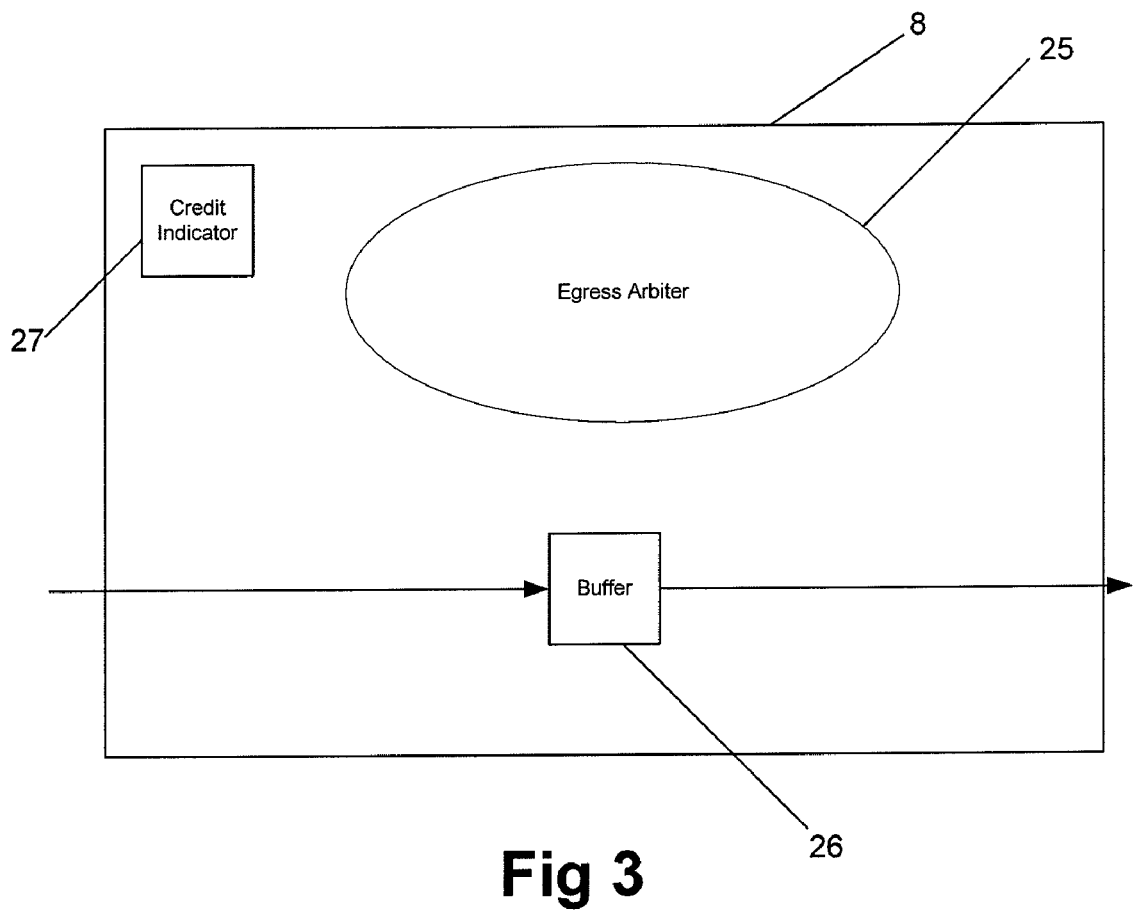
FIG. 3 is a schematic illustration of an egress module of the switch of FIG. 1.

FIG. 3 schematically illustrates the egress module 8. It is to be appreciated that the egress module 9 is similarly implemented. It can be seen that the egress module 8 comprises an egress arbiter 25 arranged to select a data packet offered by one of the ingress arbiters of the ingress modules 6, 7 for transmission through the egress port 4. The egress module 8 further comprises a single data packet buffer 26 to store an incoming data packet received from an ingress module. In some cases it is not necessary for an egress module to have a buffer, as data packets can be forwarded to the relevant egress port immediately without storage at the egress module. The use of the single packet buffer 26 may be beneficial however, to allow the switch core 18 to complete a data packet transfer in the event that there is a problem with the link from an egress port, causing a transient delay in transmitting a data packet from that egress port. Where single packet buffering is implemented in the egress module by storing the data packet in the single packet buffer 26, the switch core can complete the transfer of the data packet to the egress module, and the egress module can forward the data packet from the egress port when the problem with the link has cleared. Additionally, the provision of the single packet buffer 26 is useful where data is received at an egress port at a different transmission rate to that at which it is transmitted from the egress port. In such a case the single packet buffer 26 can buffer a received data packet so as to allow the differing transmission rates to be properly handled.

A credit state indicator 27 is set by the egress module 8 to indicate whether the egress module 8 has sufficient credit to receive a data packet. In this embodiment, the credit state indicator is a simple binary flag, where a value of '0' indicates that the egress module 8 is not able to receive a data packet, and a value of '1' indicates that the egress module 8 is able to receive a data packet. In other embodiments, the credit state indicator may indicate a quantity of credit an egress module has available, which can be compared with the size of a particular data packet to determine if that egress module can accept that particular data packet.

In some embodiments of the present invention, an ingress arbiter determines if there is credit available at the egress module associated with a particular egress port by examining the credit state indicator of that egress module. The ingress arbiter will then only offer a data packet for transmission to an egress port if the credit state indicator associated with the relevant egress module indicates that the relevant egress port has sufficient credit to receive that data packet. An egress module may receive offers of data packets from a plurality of ingress modules. In such a case an egress arbiter selects one of the offered data packets which is to be received by the egress module. This selection is conveyed to the appropriate ingress arbiter, and results in the appropriate data packet being provided to the appropriate egress module.

Operation of the congestion management controller 15 is now described in more detail with reference to FIG. 4.

Figure 4:
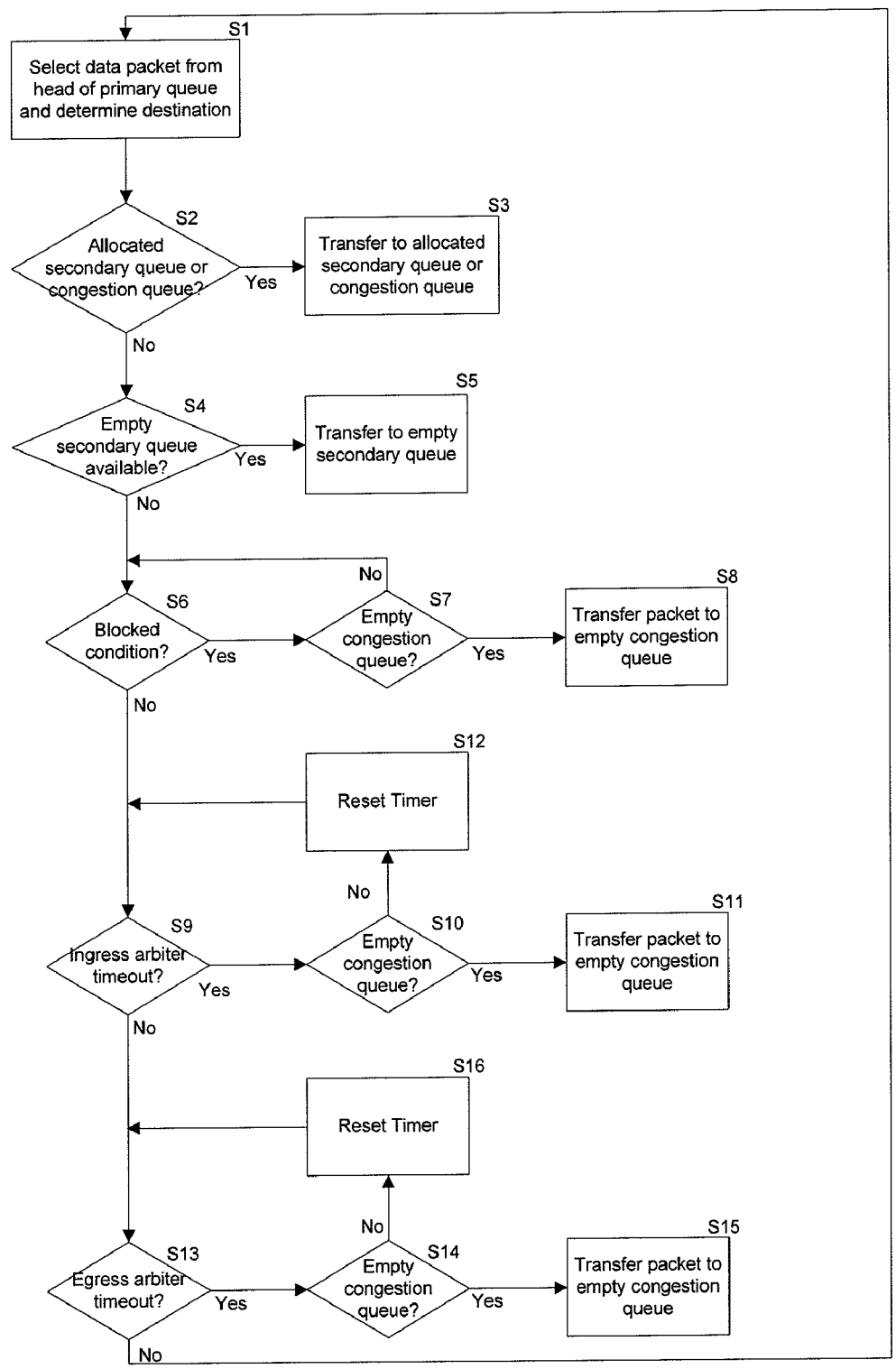
FIG. 4 is a flow chart showing processing of a primary queue of the ingress module of FIG. 2.

FIG. 4 shows the processing of the primary queue 11 carried out by the congestion management controller 15.

Referring to FIG. 4, at step S1, the congestion management controller 15 selects the data packet at the head of the primary queue 11 and determines for which egress port the selected data packet is destined, using information contained in the header of the data packet. Processing then passes to step S2. At step S2, it is determined if one of the secondary queues 12 or one of the congestion queues 13 contains data packets destined for the egress port to which the selected data packet is destined. If it is determined that this is the case at step S2, processing passes to step S3 where the selected data packet is moved from the primary queue 11 to the secondary queue 12 or the congestion queue 13 which is allocated to store data packets destined for the egress port to which the selected data packet is destined.

Given that data packets are stored in the primary queue 11 in the order in which they are received, transferring all data packets destined for a particular egress port to a single one of the secondary queues 12 or the congestion queues 13 ensures that ordering of data packets destined for a particular egress port is maintained.

If, on the other hand, the processing at step S2 determines that there is not a secondary queue or congestion queue allocated to store data packets destined for the egress port to which the data packet selected at step S1 is destined, processing passes to step S4. At step S4 it is determined whether one of the secondary queues 12 is empty. If the processing at step S4 determines that one of the secondary queues 12 is empty, the selected data packet is moved from the primary queue 11 into an empty secondary queue 12 at step S5. If more than one secondary queue is empty, the congestion management controller 15 will arbitrarily choose one of the empty secondary queues to which to move the selected data packet. When a data packet destined for a particular egress port is stored in one of the secondary queues 12, a control flag associated with that secondary queue is set to indicate that the secondary queue is associated with the particular egress port.

The processing described above with reference to steps S2 and S4 is such that, where possible, a data packet at the head of the primary queue 11 is moved to one of the secondary queues 12. This increases the data packets between which the ingress arbiter 14 can select to be offered to the relevant egress arbiters. This means that the effects of head-of-line blocking are mitigated given that data packets are distributed between a greater number of queues.

If, on the other hand, the processing of step S4 determines that there is no empty secondary queue, processing passes to step S6. At step S6 it is determined whether a blocking condition has occurred. A blocking condition will occur where it is apparent that the ingress arbiter 14 will not select the data packet at the head of the primary queue 11, for example, because of lack of credit at the relevant egress module, as indicated by the credit state indicator provided by the relevant egress module. When a blocking condition is detected, processing passes to step S7. At step S7 it is determined whether any of the congestion queues 13 is empty. If this is the case, the selected data packet is moved into an empty congestion queue 13 at step S8. If, on the other hand, it is determined at step S7 that there are no empty congestion queues 13, processing passes back to step S6, establishing a loop until an empty congestion queue 13 is available, or until the blocking condition clears.

If a blocking condition is not detected at step S6, processing passes to step S9. At step S9 it is determined whether a packet at the head of the primary queue 11 has been at the head of the primary queue 11 without having been selected by the ingress arbiter 14 for more than a predetermined time period. If this is the case, processing passes from step S9 to step S10. At step S10 a check is carried out to determine whether one of the congestion queues 13 is empty. If this is the case, the data packet at the head of the primary queue 11 is transferred to the empty congestion queue at step S11. If, however the check of step S10 indicates that there is no empty congestion queue, processing passes to step S12 where the timer is reset before processing returns to step S9. In this way, steps S9 and S10 establish a loop until either an empty congestion queue becomes available or the ingress arbiter selects the packet at the head of the primary queue within the predetermined time.

If the processing at step S9 indicates that the predetermined time limit has not been exceeded, processing passes to step S13. At step S13 it is determined whether an ingress arbiter has offered the selected data packet for transmission to a relevant egress module such that the offer has not been accepted within a predetermined time period. If this is the case, processing passes from step S13 to step S14. At step S14 it is determined whether one of the congestion queues 13 is empty. If this is the case, processing passes from step S14 to step S15 where the data packet at the head of the primary queue 11 is transferred to an empty congestion queue. If, on the other hand, the processing of step S14 indicates that none of the congestion queues 13 is empty, processing passes to step S16 where the timer is reset before processing passes to step S13.

If the processing of step S13 indicates that the predetermined time period has not expired, processing returns to step S1. It may be that the processing of step S1 simply selects the previously processed data packet from the head of the primary queue, such that the processing described above is repeated for that data packet. However, it may be that the processing of step S1 now selects a different data packet in the case where the data packet previously at the head of the primary queue has been removed from the primary queue, for example for onward transmission to the egress port for which it is destined.

From the preceding description, the congestion management controller can be considered to provide congestion management processing in three stages.

A first stage comprises, where possible, moving data packets from a primary queue to one of the secondary queues so as to maximise ingress arbiter choice. A second stage comprises moving data packets to one of the congestion queues, where either a data packet has been at the head of the primary queue for an excessively long time, or when it can be determined that the packet at the head of the primary queue cannot be selected for some reason (e.g. because of a lack of credit). A third stage again comprises moving data packets to one of the congestion queues where a data packet is offered to an egress module, but is not accepted by the relevant egress arbiter within a predetermined time period.

The preceding description has been concerned with processing of the primary queue 11 by the congestion management controller 15. Each of the secondary queues 12 is similarly processed by the congestion management controller 15 save that when a data packet of a secondary queue is selected at step S1, the processing of step S2 is concerned only with determining whether there is an allocated congestion queue. Similarly, where data packet from the one of the secondary queues 12 is selected, the processing of steps S4 and S5 is not carried out.

The processing of the primary queue 11 and the secondary queues 12 in the manner described above is carried out before the ingress arbiter 14 is able to select a data packet to be offered to a relevant egress module. In this way the ingress arbiter's choices are maximised. Additionally, data packet ordering is maintained by ensuring that where a data packet destined for a particular egress port has been moved from the primary queue 11 to one of the secondary queues 12 or one of the congestion queues 13, any other packets destined for that egress port are also moved to the same one of the secondary queues 12 and the congestion queues 13 before being made available for selection by the ingress arbiter 14.

An example of the processing described with reference to FIG. 4 is now presented with reference to FIGS. 5 to 10. For simplicity and ease of understanding, FIGS. 5 to 10 show an ingress module 34 comprising a primary queue 35, a single secondary queue 36 and a single congestion queue 37. The secondary queue 36 has an associated control flag 36a whilst the congestion queue 37 has an associated control flag 37a. These control flags indicate an egress port to which all data packets currently stored in the respective queue are to be forwarded.

The ingress module further comprises an ingress arbiter and a congestion management controller of the type described above but, for the sake of clarity, these components are not shown in FIGS. 5 to 10.

FIGS. 5 to 10 are described in the context of a switching device having three egress ports denoted A, B and C. A credit state indicator 38 is associated with the egress port A, a credit state indicator 39 is associated with the egress port B and a credit state indicator 40 associated with an egress port C.

Figure 5:
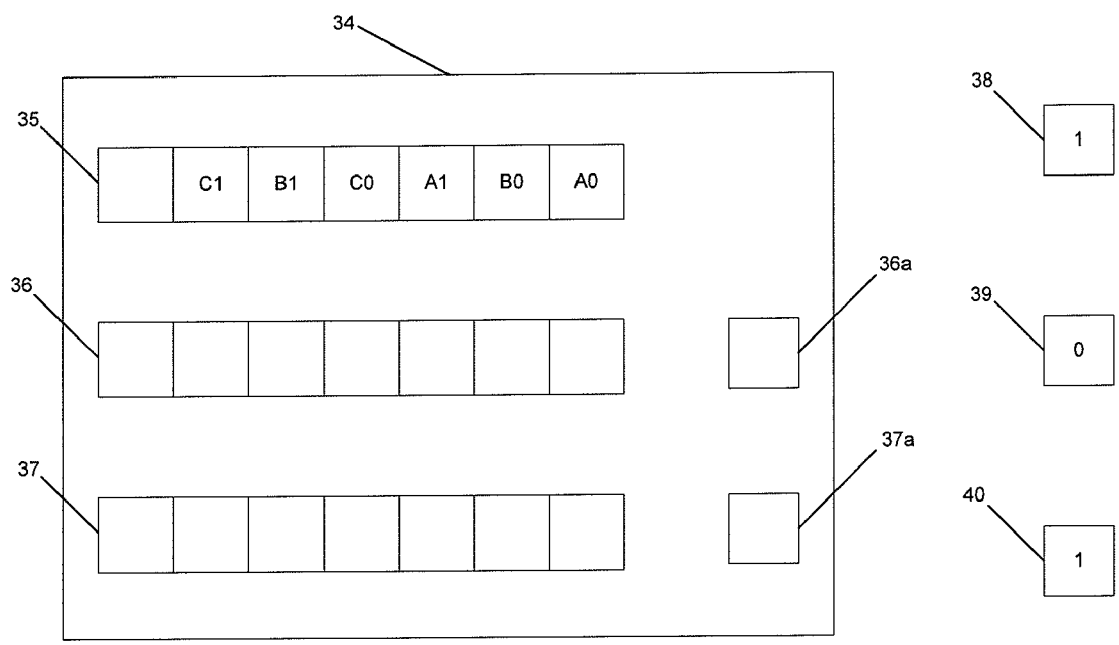
FIGS. 5 to 10 are schematic illustrations showing how queues, control flags and credit state indicators are used in the processing of FIG. 4.

Referring to FIG. 5, it can be seen that the primary queue 35 contains six data packets A0, B0, A1, C0, B1, C1. Each data packet is identified by a letter indicating the egress port for which it is destined, and a number indicating a sequence number of the data packet relative to other data packets destined for the same egress port. That is, data packet A0 is a first data packet destined for the egress port A, data packet A1 is a second data packet destined for the egress port A, and data packet B0 is a first data packet destined for the egress port B.

It can also be seen that the credit state indicators 38 and 40 have a value '1' indicating that each of the egress ports A and C have sufficient credit to receive a data packet. The credit state indicator 39 has a value '0' indicating that the egress port B does not have sufficient credit to receive a data packet. Neither control flag 36a, 37a is set, indicating that the secondary queue 36 and the congestion queue 37 are both empty and can therefore receive data packets destined for any egress port.

The data packet at the head of the primary queue 35 is the data packet A0 destined for the egress port A. The congestion management controller processes the data packet A0 in accordance with the processing described with reference to FIG. 4.

The congestion management controller of the ingress module 34 determines if the data packet A0 should or can be moved into the secondary queue 36 by checking the control flag 36a. As the control flag 36a indicates that the secondary queue is empty (step S4), the congestion management controller moves the data packet A0 into the secondary queue 36 (step S5), and the control flag 36a is appropriately set.

Figure 6:
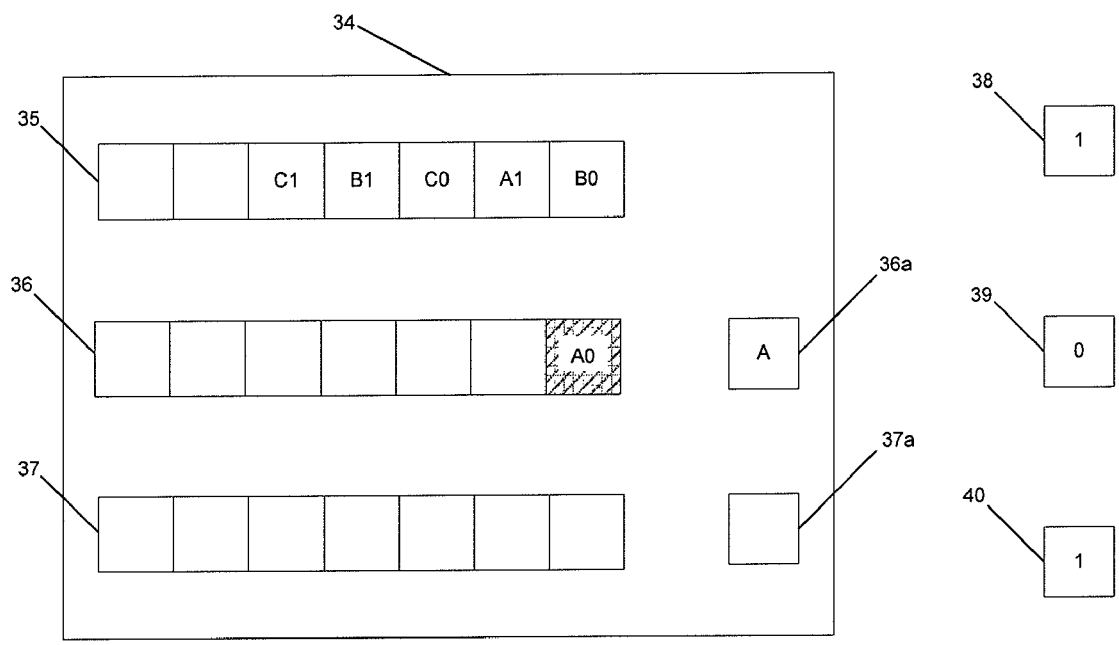

FIG. 6 illustrates the state of the queues 35, 36, 37, control flags 36a, 37a and credit state indicators 38, 39, 40 after the processing described with reference to FIG. 5. It can be seen that the data packet A0 is now at the head of the secondary queue 36. As such, the control flag 36a has a value 'A', indicating that the secondary queue 36 has been allocated to data packets destined for the egress port A. Data packet A0 is now available for selection by the ingress arbiter of the ingress module 34 as indicated by shading.

The data packet at the head of the primary queue 35 is now the data packet B0, destined for the egress port B. The congestion management controller determines whether the data packet B0 should be moved to the secondary queue 36 by checking the control flag 36a. As the control flag 36a indicates that the secondary queue 36 is allocated for data packets destined for the egress port A (steps S2 and S4) the data packet B0 cannot be moved to the secondary queue 36.

As the credit state indicator 39 indicates that the egress port B cannot receive a data packet, the congestion management controller determines that a blocking situation has occurred (step S6) and as such, determines whether the congestion queue 37 is empty (step S7) by checking the control flag 37a. As the control flag 37a indicates that the congestion queue 37 is empty, the data packet B0 is moved to the congestion queue 37 immediately (step S8), without waiting for a timeout period to elapse.

Figure 7:
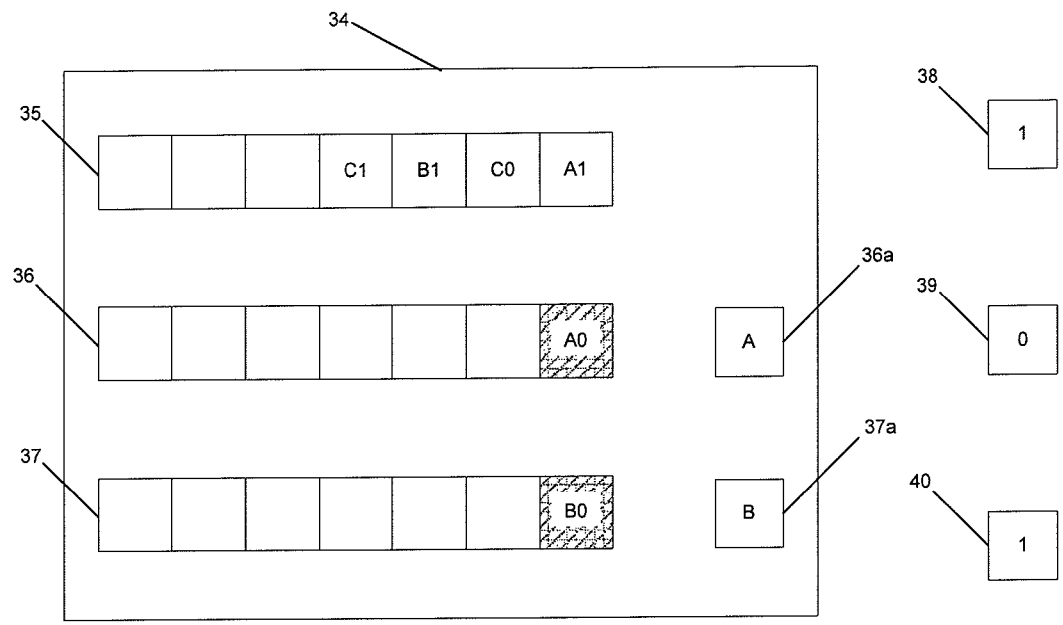

FIG. 7 shows the state of the queues, flags and credit state indicators after the processing described with reference to FIG. 6.

Referring to FIG. 7, it can be seen that the data packet A0 is still stored in the secondary queue 36 as it has not yet been selected by the ingress arbiter of the ingress module 34. The data packet B0 is now at the head of the congestion queue 37 and is available for selection by the ingress arbiter of the ingress module 34. As such the control flag 37a has a value 'B'.

The data packet at the head of the primary queue 35 is the data packet A1, destined for the egress port A. The congestion management controller determines whether the data packet A1 should be moved to the secondary queue 36 by checking the control flag 36a. As the control flag 36a indicates that the secondary queue 36 has been allocated to data packets destined for the egress port A (step S2), the data packet A1 is moved to the secondary queue 36 (step S3) in order to maintain ordering of data packets destined for the egress port A.

The data packet A0 is transmitted from the secondary queue to the egress port A, through selection by the ingress arbiter, and subsequent selection by the egress arbiter.

Figure 8:
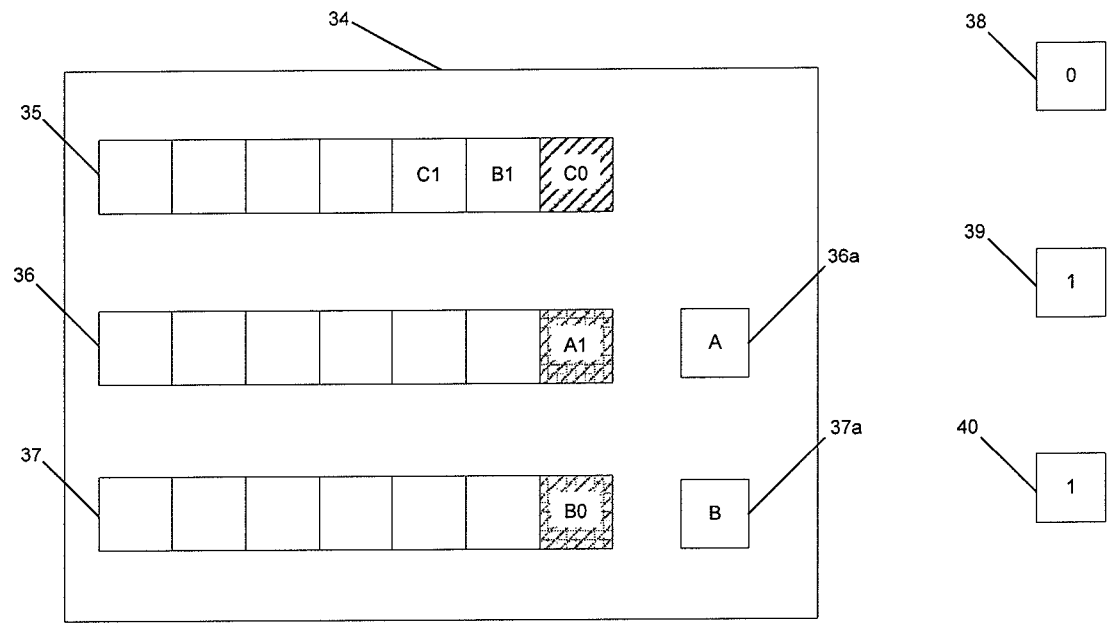

FIG. 8 shows the state of the queues 35, 36, 37, control flags 36a, 37a and credit state indicators 38, 39, 40 after the processing described with reference to FIG. 7.

Referring to FIG. 8, it can be seen that, as the data packet A0 has been transmitted from the secondary queue 36 to the egress port A, the data packet A1 is now at the head of the secondary queue 36. The credit indicator 38 now has a value '0' indicating that the egress port A cannot presently receive further data packets. This is a blocking situation, and as such the congestion management controller determines if the congestion queue 37 is available by checking the control flag 37a (step S6 as applied to the secondary queue 36). As the control flag 37a indicates that the congestion queue 37 is not empty and is allocated to data packets destined for the egress port B, the data packet A1 remains in the secondary queue 36.

Data packet B0 is still at the head of the congestion queue 37. The credit state indicator 39 now has a value '1' indicating that the egress port B is able to receive data packets.

It can be seen that the data packet at the head of the primary queue is the data packet C0 destined for the egress port C. The congestion management controller determines if the data packet C0 can or should be moved to the secondary queue 36 or the congestion queue 37 by checking the control flags 36a, 37a (steps S2 and S4). As the control flag 36a indicates that the secondary queue 36 is allocated to data packets destined for the egress port A, it is not possible to move the data packet C0 into the secondary queue 36. Similarly, given that the control flag 37a indicates that the congestion queue 37 is allocated to data packets destined for the egress port B, it is not possible to move the data packet C0 to the congestion queue 37.

The credit indicator 40 has a value '1' indicating that the egress port C is able to accept data packets. As such, there is no blocking condition (step S6) and the data packet C0 remains in the primary queue 35. Given that the data packet C0 is not able to be moved to the secondary queue 36 or the congestion queue 37 it is made available for selection by the ingress arbiter to be offered to the relevant egress module.

The data packet B0 is forwarded to the egress port B, freeing the congestion queue 37. As such, the control flag 37a is cleared.

Figure 9:
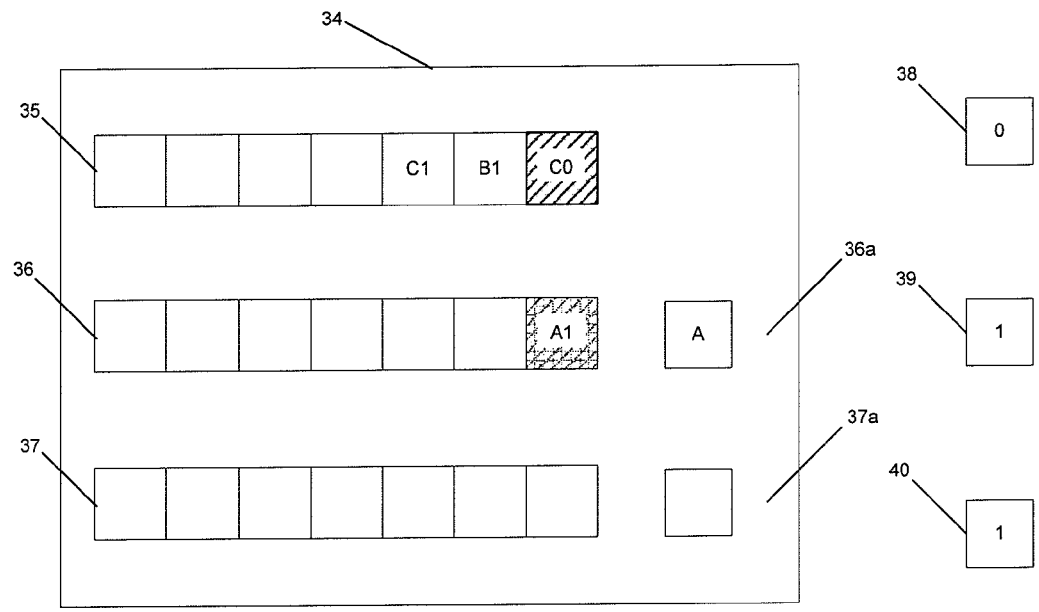

FIG. 9 shows the state of the queues 35, 36, 37, control flags 36a, 37a and credit state indicators 38, 39, 40 after the processing described with reference to FIG. 8.

Referring to FIG. 9, it can be seen that the data packet A1 is still held in the secondary queue 36. The credit state indicator 38 indicates that the egress port A cannot presently receive any further data packets, creating a blocking condition (detected at step S6 as applied to the secondary queue 36). As such, the congestion management controller determines whether there is a congestion queue available by checking the control flag 37a (step S7). As the control flag 37a indicates that the congestion queue 37 is now empty, the congestion management controller moves the data packet A1 into the congestion queue 37 (step S8) thereby clearing the secondary queue 36. As such the control flag 36a is cleared and the control flag 37a is set to a value 'A'.

When processing the primary queue 35, the congestion management controller determines that the secondary queue 36 is empty (step S4), and moves the data packet C0 at the head of the primary queue 35 into the secondary queue 36 (step S5).

Figure 10:
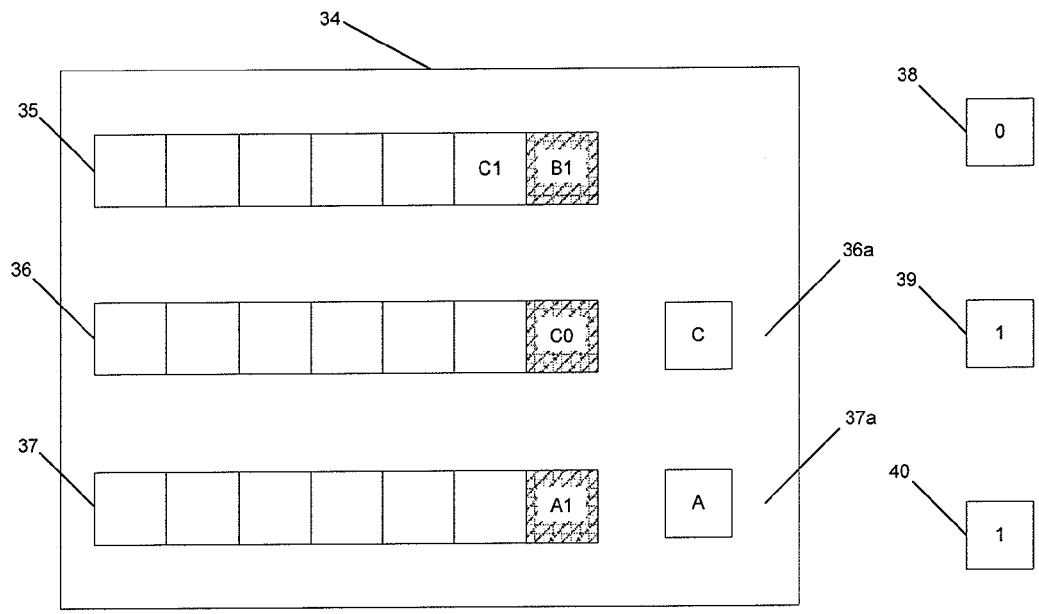

FIG. 10 shows the queues, flags and credit state indicators after the processing described with reference to FIG. 9.

Referring to FIG. 10 it can be seen that the data packet A1 is now at the head of the congestion queue 37, the data packet C0 is at the head of the secondary queue 36 and the data packet B1 is at the head of the primary queue 35. Each data packet is available for selection by the ingress arbiter, given that the congestion management controller determines that the data packet B1 at the head of the primary queue 35 cannot be moved.

It will be appreciated that embodiments of the present invention can be implemented in any convenient way. For example the switch of FIG. 1 may be a hardware device comprising random access memory arranged to store the primary, secondary and congestion buffers and a processor arranged to control receipt and transmission of data packets as well as to control operation of components of the switch. The processor may take any convenient form including an application specific integrated circuit or a general-purpose microprocessor which is appropriately programmed.

Further, it will be appreciated that while the credit state indicator has been described in terms of a bit flag stored in each egress module, in other embodiments, the credit indicator may be a signal which is broadcast from the egress module to each ingress module, wherein the ingress module updates a stored credit state for each of the egress modules upon receipt of the credit state indicator.

The methods described above are generally applicable to any switching application where it is necessary to send data packets from an input to a plurality of outputs where the output is any combination of a port, a link, a virtual channel or a traffic class. The methods described above are particularly suitable for use with switching devices using the PCI Express and Infiniband protocols.

PCI Express links may comprise one or more bidirectional lanes, one direction for receiving data packets, the other for transmitting data packets. The number of lanes in a particular link is denoted by Nx, where N is the number of bidirectional lanes. For example, an 8x link has eight bidirectional lanes.

Each link may be run at different data rates, for example, a standard data rate (SDR) of 2.5 Gb/s or a double data rate (DDR) of 5 Gb/s. The particular data rate of a particular link is dependent upon the bandwidth required for the particular application along with the level of PCI Express support offered.

It will be appreciated that the actual number of secondary queues and congestion queues provided by a switching device may vary. For example, where the switching device uses the PCI Express protocol, an ingress module associated with a 4x ingress port may comprise two secondary queues and four congestion queues, while an ingress module associated with an 8x ingress port may comprises four secondary queues and eight congestion queues.

Figure 11:
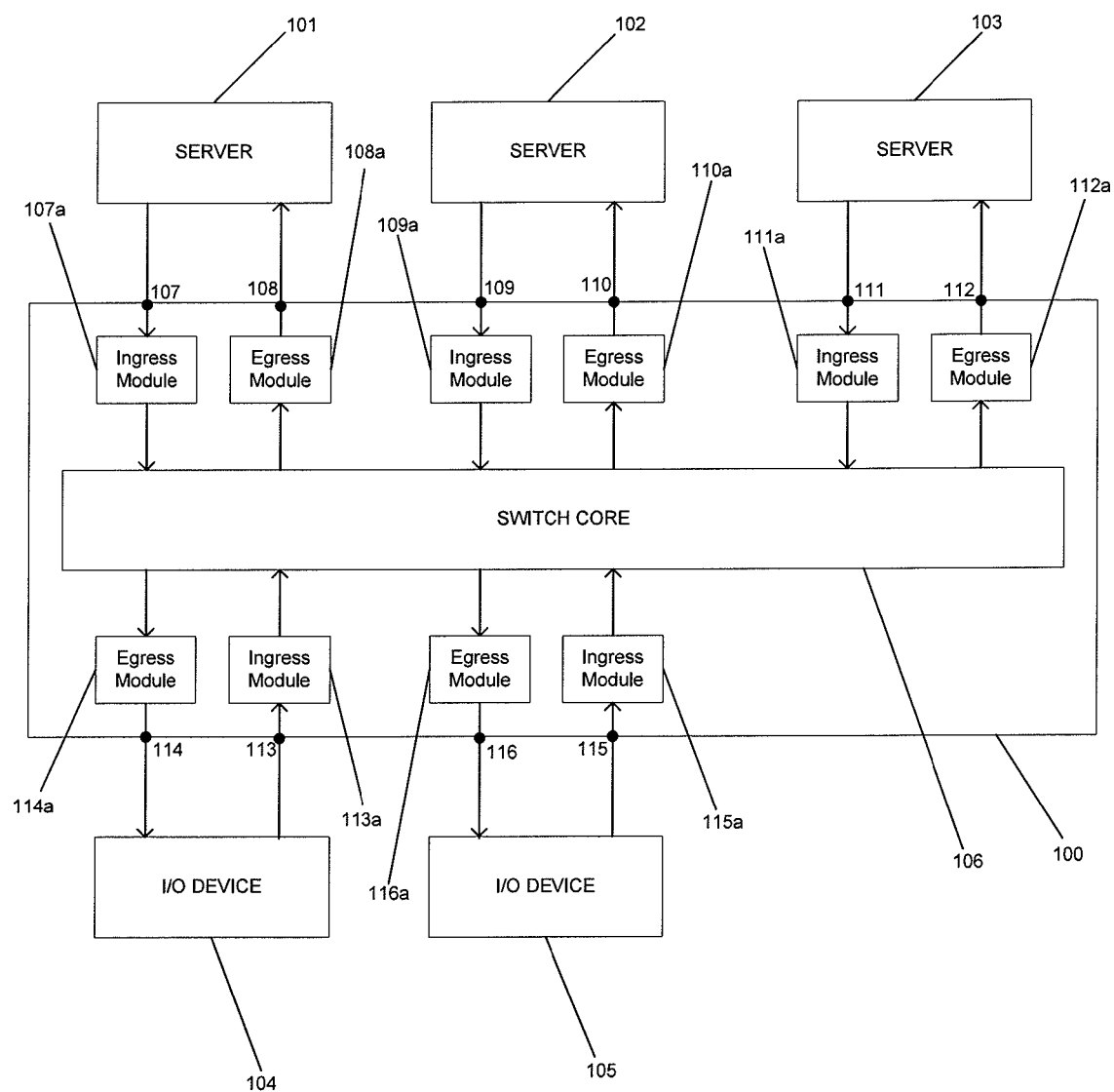
FIG. 11 is a schematic illustration of a switch connecting a plurality of input/output (I/O) devices to a plurality of servers.

One particular application for a switching device of the type described herein relates to the connection of a plurality of servers to a plurality of input/output (I/O) devices so that the plurality of servers each have shared access to each of the plurality of I/O devices. FIG. 11 is a schematic illustration of such an arrangement.

FIG. 11 shows a switch 100 connecting three servers 101, 102, 103 to two I/O devices 104, 105. The switch 100 comprises a switch core 106 arranged to direct data packets between ingress and egress ports of the switch.

The server 101 is connected to an ingress port 107 and to an egress port 108 of the switch 100. The ingress port 107 has an associated ingress module 107a of the type described above, while the egress port 108 has an associated egress port module 108a of the type described above. The connection of the server 101 to the ingress port 107 allows the server 101 to transmit data to the switch 100, while the connection of the server 101 to the egress port 108 allows data to be transmitted from the switch 100 to the server 101. The server 102 is similarly connected to an ingress port 109 having an associated ingress module 109a and to an egress port 110 having an associated egress module 110a, while the server 103 is connected to an ingress port 111 having an associated ingress module 111a and to an egress port 112 having an associated egress module 112a.

The I/O device 104 is connected to the switch 100 through an ingress port 113 having an associated ingress module 113a and through an egress port 114 having an associated egress module 114a. Similarly, the I/O device 105 is connected to the switch 100 through an ingress port 115 having an associated ingress module 115a and through an egress port 116 having an associated egress module 116a.

It will be appreciated that the arrangement shown in FIG. 11 allows resources provided by the I/O devices 104, 105 to be effectively shared by the servers 101, 102, 103.

Various modifications and applications of the present invention will be readily apparent to the appropriately skilled person from the teaching herein, without departing form the scope of the appended claims.

Although the switching device of FIG. 1 has two ingress ports and two egress ports it will be appreciated that in many embodiments of the invention switches with greater numbers of ingress and egress ports will be provided. It will be appreciated that equal numbers of ingress and egress ports allow that same number of devices to be bi-directionally coupled to the switch. It will however be appreciated that in alternative embodiments of the invention different numbers of ingress and egress ports may be provided.

While the processing described with reference to FIG. 4 is such that a data packet may be moved directly from a primary queue to a congestion queue (step S3), in alternative embodiments of the invention data packets may only be moved from a primary queue to a secondary queue, and then be subsequently moved to a congestion queue as appropriate.

Similarly, while the example presented with reference to FIGS. 5 to 10 has explained when data packets at the heads of the primary and secondary queues are available for selection by an arbiter, it will be appreciated that in alternative embodiments of the invention data packets may be made available for selection in different circumstances or when, for example, different conditions are satisfied.

The preceding description has been based upon the use of a primary queue, a plurality of secondary queues and a plurality of congestion queues. It will be appreciated that in alternative embodiments of the invention data packets may be stored in buffers which are not arranged as queues, but which instead are arranged in some other convenient way. Where data packets are stored in queues, each queue may be arranged as a first-in, first-out queue, although it will be appreciated that other types of queue can be used.

It should also be appreciated that in alternative embodiments of the invention a plurality of primary buffers (or queues) may be provided. The provision of a plurality of primary buffers may be useful when, for example, a particular ingress port is arranged to support a plurality of virtual channels. In such a case, separate primary buffers may be pre-allocated for each virtual channel, or alternatively a predetermined number of primary buffers may be provided and allocated to particular channels on a first come, first served basis as data packets are received through the relevant ingress port.

The invention claimed is:

1. A switching device comprising at least one ingress port and at least one egress port, the switching device being arranged to receive data packets through said at least one ingress port and to forward received data packets to respective ones of said at least one egress port, wherein the switching device further comprises:
    a primary buffer arranged to store data packets received via at least one of said at least one ingress ports;
    a secondary buffer associated with the primary buffer; and
    at least one congestion buffer associated with said primary buffer;
wherein the switching device is adapted to:
    select a data packet from said primary buffer; and
    if but only if said secondary buffer satisfies at least one first predetermined criterion, transfer said selected data packet to said secondary buffer, and
wherein the switching device is further adapted to:
    determine whether a second predetermined criterion is satisfied; and
    if said second predetermined criterion is satisfied, transfer a data packet from one of said primary or secondary buffers to one of said at least one congestion buffers, wherein the second predetermined condition is that said data packet has resided in one of said primary and secondary buffers for more than a predetermined minimum time.

2. A switching device according to claim 1,
    , wherein said secondary buffer is adapted to store data packets to be forwarded to any of said egress ports when said secondary buffer is empty; and
    wherein the switching device is adapted to:
    determine an egress port to which said selected data packet is to be forwarded; and
    transfer said selected data packet to said secondary buffer if but only if said secondary buffer is empty or said secondary buffer contains only data packets to be forwarded to an egress port to which said selected data packet is to be forwarded.

3. A switching device according to claim 1, further comprising:
an ingress module for each of said at least one ingress ports, each ingress module being arranged to receive data packets from a respective one of said at least one ingress ports;
wherein each ingress module comprises a primary buffer and at least one secondary buffer.

4. A switching device according to claim 1, wherein said primary buffer is arranged to receive data packets received through a single one of said ingress ports.

5. A switching device according to claim 4, wherein all data packets received through said single one of said ingress ports is stored in said primary buffer, regardless of egress ports to which said data packets are to be forwarded.

6. A switching device according to claim 1 comprising a plurality of secondary buffers associated with said primary buffer.

7. A switching device according to claim 6, wherein said switching device is arranged to store, in each of said secondary buffers at any one time, data packets to be forwarded to a respective single one of said egress ports.

8. A switching device according to claim 1, wherein said primary buffer is a primary queue and/or wherein said the or each secondary buffer is a secondary queue.

9. A switching device according to claim 1, further comprising:
an ingress arbiter associated with said primary buffer and the or each associated secondary buffer;
wherein said ingress arbiter is arranged to select a data packet from one of said primary and secondary buffers to be offered for transmission to an egress port.

10. A switching device according to claim 9, further comprising:
at least one egress arbiter associated with at least one of said egress ports;
wherein the egress arbiter is adapted to receive requests for permission to transmit a data packet from at least one ingress arbiter and to grant one of said received requests.

11. A switching device according to claim 1, wherein a data packet is transferred to one of said congestion buffers only if:
said congestion buffer is empty; or
said congestion buffer stores data packets to be forwarded to an egress port to which the data packet to be transferred is to be forwarded.

12. A switching device according to claim 1, further adapted to:
transfer a data packet from said primary buffer to a congestion buffer if said data packet is to be forwarded to an egress port to which data packets stored in said congestion buffer are to be forwarded.

13. A switching device according to claim 1, wherein the or each congestion buffer is a congestion queue.

14. A switching device according to claim 1, wherein the second predetermined condition is indicative of congestion within the switching device.

15. A switching device according to claim 1, further comprising:
an ingress arbiter associated with said primary buffer and the or each associated secondary buffer;
wherein said ingress arbiter is arranged to select a data packet from one of said primary and secondary buffers to be offered for transmission to an egress port, and said ingress arbiter is arranged to select a data packet from at least one of said primary, secondary and congestion buffers, to be offered for transmission to an egress port.

16. A switching device according to claim 15, wherein said switching device is adapted to transfer a data packet from one of said primary and secondary queues if said data packet has resided in one of said primary and secondary queues for more than a predetermined minimum time without having been selected by said ingress arbiter.

17. A switching device according to claim 15, wherein one of said second predetermined criteria is based upon whether said ingress arbiter is able to select a particular data packet.

18. A switching device according to claim 17, further comprising:
at least one egress module, each egress module being arranged to select a data packet to be transmitted through a respective egress port, each egress port being arranged to provide data indicating whether data packets can be received by the particular egress port.

19. A switching device according to claim 18, wherein said ingress arbiter is able to select a data packet only if an egress module indicates that an egress port to which the data packet is to be forwarded is able to receive data packets.

20. A switching device according to claim 18, wherein the or each egress module is arranged to:
receive a plurality of requests to receive a data packet, each request being generated by an ingress arbiter;
select one of the plurality of requests;
wherein the second predetermined criterion is based upon an egress module selecting a request within a predetermined time period.

21. A method of switching data packets from at least one ingress port to at least one egress port, wherein data packets are received through said at least one ingress port and forwarded to respective ones of said at least one egress port, the method comprising:
storing data packets received via at least one of said at least one ingress ports in a primary buffer;
selecting a data packet from said primary buffer;
if but only if said secondary buffer satisfies at least one first predetermined criterion, transferring said selected data packet to a secondary buffer; and
determining whether a second predetermined criterion is satisfied; and
if said second predetermined criterion is satisfied, transferring a data packet from one of said primary or secondary buffers to one of at least one congestion buffers, wherein the second predetermined condition is that said data packet has resided in one of said primary and secondary buffers for more than a predetermined minimum time.

22. A non-transitory carrier medium carrying a computer program comprising computer readable instructions arranged to cause a switching device to carry out a method according to claim 21.

23. A switching device comprising at least one ingress port and at least one egress port, the switching device being arranged to receive data packets through said at least one ingress port and to forward received data packets to respective ones of said at least one egress port, wherein the switching device further comprises:
a primary buffer arranged to store data packets received via at least one of said at least one ingress ports;
a secondary buffer associated with the primary buffer;
at least one congestion buffer associated with said primary buffer; and
an ingress arbiter associated with said primary buffer and the or each associated secondary buffer, said ingress arbiter arranged to select a data packet from one of said primary and secondary buffers to be offered for transmission to an egress port, and said ingress arbiter is arranged to select a data packet from at least one of said primary, secondary and congestion buffers, to be offered for transmission to an egress port;

wherein the switching device is adapted to:
select a data packet from said primary buffer and if but only if said secondary buffer satisfies at least one first predetermined criterion, transfer said selected data packet to said secondary buffer, wherein one of said at least one first predetermined criterion is that said secondary buffer is empty; and wherein the switching device is further adapted to determine whether a second predetermined criterion is satisfied and if said second predetermined criterion is satisfied, transfer a data packet from one of said primary or secondary buffers to one of said at least one congestion buffers; and wherein said switching device is adapted to transfer a data packet from one of said primary and secondary queues if said data packet has resided in one of said primary and secondary queues for more than a predetermined minimum time without having been selected by said ingress arbiter.

24. A switching device comprising at least one ingress port and at least one egress port, the switching device being arranged to receive data packets through said at least one ingress port and to forward received data packets to respective ones of said at least one egress port, wherein the switching device further comprises:
a primary buffer arranged to store data packets received via at least one of said at least one ingress ports;
a secondary buffer associated with the primary buffer;
at least one congestion buffer associated with said primary buffer;
an ingress arbiter associated with said primary buffer and the or each associated secondary buffer, said ingress arbiter arranged to select a data packet from one of said primary and secondary buffers to be offered for transmission to an egress port, and said ingress arbiter is arranged to select a data packet from at least one of said primary, secondary and congestion buffers, to be offered for transmission to an egress port; and
at least one egress module, each egress module being arranged to select a data packet to be transmitted through a respective egress port, each egress port being arranged to provide data indicating whether data packets can be received by the particular egress port;

wherein the switching device is adapted to:
select a data packet from said primary buffer and if but only if said secondary buffer satisfies at least one first predetermined criterion, transfer said selected data packet to said secondary buffer, wherein one of said at least one first predetermined criterion is that said secondary buffer is empty; and wherein the switching device is further adapted to determine whether a second predetermined criterion is satisfied and if said second predetermined criterion is satisfied, transfer a data packet from one of said primary or secondary buffers to one of said at least one congestion buffers wherein one of said second predetermined criteria is based upon whether said ingress arbiter is able to select a particular data packet; and wherein the or each egress module is arranged to receive a plurality of requests to receive a data packet, each request being generated by an ingress arbiter, and select one of the plurality of requests, wherein the second predetermined criterion is based upon an egress module selecting a request within a predetermined time period.

* * * * *